United States Patent
Dai et al.

(10) Patent No.: US 10,469,574 B1
(45) Date of Patent: Nov. 5, 2019

(54) INCREMENTAL CONTAINER STATE PERSISTENCY AND REPLICATION FOR CONTAINERIZED STATEFUL APPLICATIONS

(71) Applicants: EMC Corporation, Hopkinton, MA (US); EMC IP Holding Company LLC, Hopkinton, MA (US)

(72) Inventors: Cang Dai, Beijing (CN); Yu Cao, Beijing (CN); Vivian Gao, Beijing (CN); Kenneth Durazzo, San Ramon, CA (US); Grace Cui, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 571 days.

(21) Appl. No.: 15/134,041

(22) Filed: Apr. 20, 2016

(51) Int. Cl.
*G06F 16/00* (2019.01)
*H04L 29/08* (2006.01)
*G06F 9/455* (2018.01)
*G06F 16/27* (2019.01)

(52) U.S. Cl.
CPC ...... *H04L 67/1095* (2013.01); *G06F 9/45558* (2013.01); *G06F 16/27* (2019.01); *G06F 2009/45595* (2013.01)

(58) Field of Classification Search
CPC ......... G06F 17/30138; G06F 17/30008; G06F 11/1435; G06F 11/1456; G06F 3/0608; G06F 3/30665; G06F 3/067; G06F 9/45558; G06F 16/27; G06F 2009/45595; H04L 67/1095
USPC ................. 707/610, 634, 638, 624
See application file for complete search history.

(56) References Cited

U.S. PATENT DOCUMENTS

| | | | |
|---|---|---|---|
| 6,678,700 B1 * | 1/2004 | Moore | G06F 17/30233 |
| 7,620,774 B1 * | 11/2009 | Waxman | G06F 9/5055 709/218 |
| 7,631,155 B1 * | 12/2009 | Bono | G06F 3/0608 707/999.202 |
| 8,996,482 B1 * | 3/2015 | Singh | G06F 16/27 707/698 |
| 9,043,567 B1 * | 5/2015 | Modukuri | G06F 16/00 711/162 |

(Continued)

OTHER PUBLICATIONS

N. Gohring, "Flocker, A Nascent Docker Service for Making Containers Portable, Data and All," The Newstack, https://thenewstack.io/flocker-a-nascent-docer-service-for-making-containers-portable-data-andall/, Aug. 12, 2014, 12 pages.

(Continued)

*Primary Examiner* — Vincent F Boccio
(74) *Attorney, Agent, or Firm* — Ryan, Mason & Lewis, LLP (57) ABSTRACT

A container is obtained at a host device of a set of host devices in a container hosting environment. At the host device, one or more other host devices of the set of hosting devices are identified as one or more replica host devices. A commit operation is performed at the host device for a given layer of the obtained container. A synchronization operation is then initiated at the host device with each of the one or more replica host devices based on the committed layer of the obtained container to form a replica container at each of the one or more replica host devices. The replica container at each of the one or more replica host devices is state-synchronized with the obtained container.

20 Claims, 5 Drawing Sheets

(56) References Cited

U.S. PATENT DOCUMENTS

| | | | |
|---|---|---|---|
| 10,002,247 B2* | 6/2018 | Suarez | G06F 21/53 |
| 2002/0059519 A1* | 5/2002 | Yamagishi | H04L 63/045 |
| | | | 713/175 |
| 2014/0115139 A1* | 4/2014 | Bradley | H04L 41/50 |
| | | | 709/223 |
| 2014/0279909 A1* | 9/2014 | Sudarsanam | G06F 17/30088 |
| | | | 707/639 |
| 2015/0310054 A1* | 10/2015 | Passey | G06F 17/30221 |
| | | | 707/703 |
| 2017/0075921 A1* | 3/2017 | Benton | G06F 17/30174 |
| 2017/0177860 A1* | 6/2017 | Suarez | G06F 21/53 |

OTHER PUBLICATIONS

"How to manage more containers with Docker Swarm," https://medium.freecodecamp.org/how-to-manage-more-containers-with-docker-swarm-332b5fc4c346, Sep. 2018, 8 pages.

"What is Kubernetes?," https://kubernetes.io/docs/concepts/overview/what-is-kubernetes/, Sep. 2018, 7 pages.

\* cited by examiner

| FIELD NAME | DESCRIPTION |
|---|---|
| 402 — TOP LAYER | TOP LAYER ID. EVERY LAYER HAS A UNIQUE ID. |
| 404 — PREVIOUS LAYER(S) | FORMER LAYER ID(s). FIRST LAYER (IN BASE LAYERS) IS BLANK LAYER AND HAS NO PREVIOUS LAYER, OTHER LAYERS EACH RELIES ON ONE PREVIOUS LAYER. |

INCREMENTAL CONTAINER STATE PERSISTENCY AND REPLICATION FOR CONTAINERIZED STATEFUL APPLICATIONS

FIELD

The field relates generally to computing environments, and more particularly to containerized stateful applications.

BACKGROUND

Recently, operating-system-level virtualization has become more and more widely used in cloud computing and platform as a service (PaaS) frameworks. Operating-system-level virtualization is a server-virtualization method where the operating system kernel allows multiple isolated user space instances called containers. On the Linux operating system, with support from kernel namespaces and the cgroups mechanism, emerging container solutions such as Docker and LXC have been attracting more and more attention and are currently in rapid development. Compared with a traditional virtual machine, a container uses a smaller image size, launches faster, and costs less resources (e.g., memory, processing clock cycles), thus making the container a lightweight and fast virtualization solution.

SUMMARY

Embodiments of the invention provide techniques for state persistency and replication for containerized stateful applications.

For example, in one embodiment, a method comprises the following steps. A container is obtained at a host device of a set of host devices in a container hosting environment. At the host device, one or more other host devices of the set of hosting devices are identified as one or more replica host devices. A commit operation is performed at the host device for a given layer of the obtained container. A synchronization operation is then initiated at the host device with each of the one or more replica host devices based on the committed layer of the obtained container to form a replica container at each of the one or more replica host devices. The replica container at each of the one or more replica host devices is state-synchronized with the obtained container.

Advantageously, upon failure of the obtained container at the host device, the obtained container is restored with one of the replica containers from one of the replica host devices. Furthermore, the replica host devices may be used in migration, high availability, and backup and recovery processes within the container hosting environment.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above, containers have rapidly become the virtualization choice over traditional virtual machines for hosting application programs (applications) in cloud computing environments. However, the existing container file system implementation faces challenges with state management for containerized stateful applications, as well as for corresponding application migration, high availability (HA), and backup and recovery functions.

"Containerized stateful application" refers to an application that executes in a container and keeps track of former (previous) container execution states. For containerized stateful applications, it is realized herein that the problems to a large extent equate with preservation and distribution of container states. At present, most state management approaches either rely on underlying shared storage (e.g., open-source Flocker solution) or are implemented at application level (e.g., database backup and recovery from its journal file). That is, conventionally, application state management is tackled in an application-centric manner. As a result, the corresponding developed solutions are tailored for specific applications (e.g., a database system has its own data consistency and persistency mechanism), which lacks of general applicability and reusability. Furthermore, since existing container migration/HA/backup and recovery methods (e.g., Flocker) are very much application-dependent, this brings unnecessary redundancy and inconsistency between different applications, and makes it difficult to scale out. In other words, the existing container technology lacks an infra-level and generic container state persistency and replication solution.

To overcome the above and other drawbacks, illustrative embodiments of the invention provide a system and methodologies of incremental container (i.e., containerized application) state persistency and replication. In such system and methodologies, containers establish connection with multiple replica hosts during initialization. Leveraging a container's lightweight commit operation and layered file system, containers synchronize states with a replica host in an incremental way. Moreover, the system compresses data by layer combination and consolidation. When container failures or host failures occur, the system can restore a container with state from the replica hosts, so that advanced failover solutions such as migration, HA, and backup and recovery can be implemented based on this approach. In such a way, an infrastructure level solution is provided for containerized stateful application migration, HA, and backup and recovery functions. Moreover, implementation at the infrastructure-level brings consistency of experience. Further, synchronizing a layer instead of the entire file system content greatly reduces the amount of data transmission, which makes the migration/HA/backup and recovery functions much faster.

Before describing incremental container state persistency and replication methodologies according to illustrative embodiments, an overview of a container system with which illustrative embodiments can be implemented will be given.

In order to achieve portability and reusability, a container makes use of a union mount mechanism to construct and combine different layers for file sharing, instead of using an entire disk image file as a traditional virtual machine does. Specifically, after container initialization, the container union mounts base layers (read-only) and a top layer (read-write) together to build a root file system. During the container's lifecycle, all modifications to the root file system are written on the top layer in an incremental way. The commit operation causes the container to save the current top layer and to start to write on a new layer over the saved top layer, thus creating a new top layer.

Figure 1:
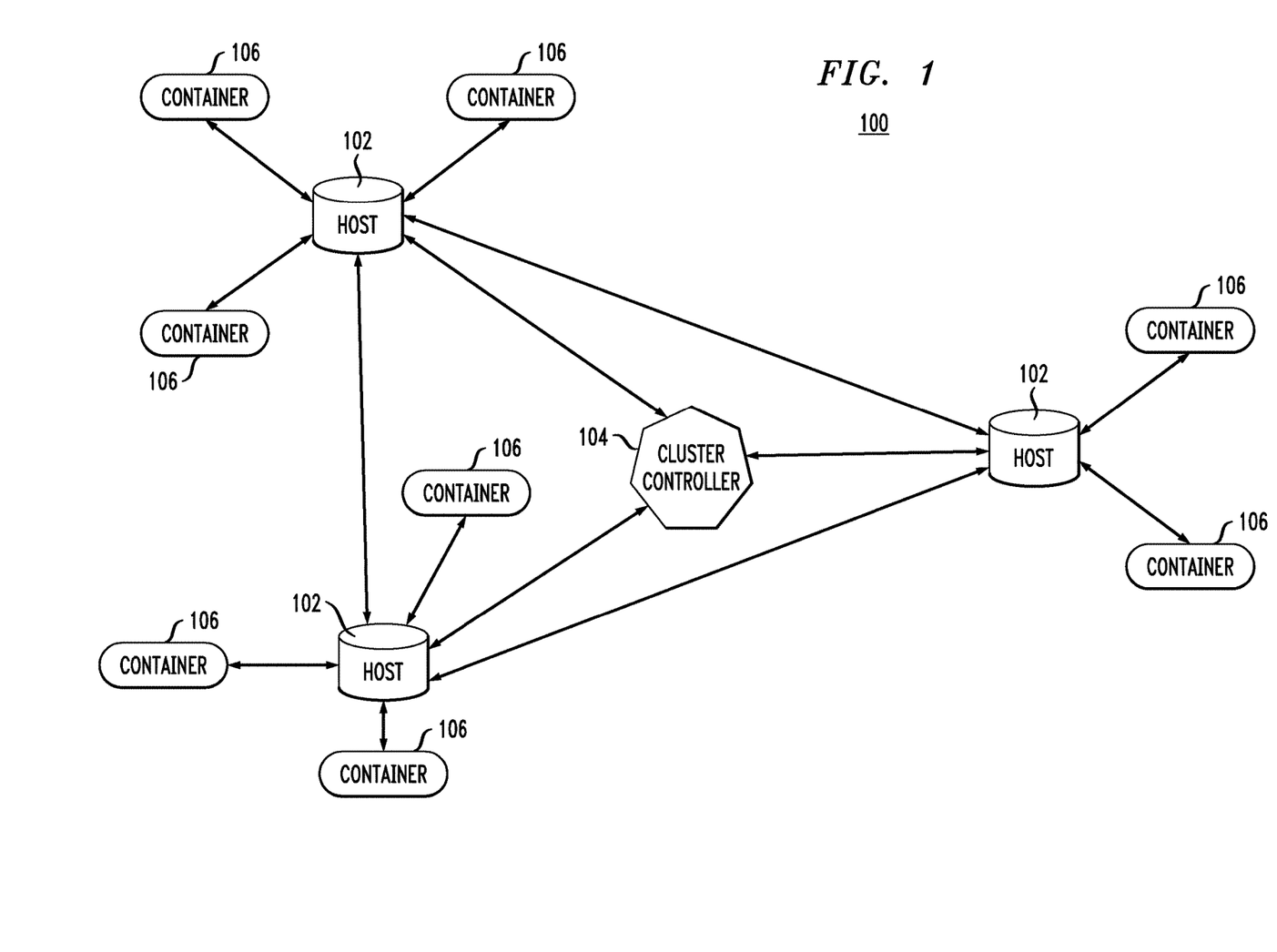
FIG. 1 illustrates a container hosting environment in accordance with which one or more embodiments of the invention are implemented.

As shown in FIG. 1, a container cluster 100 (e.g., Docker Swarm, Magnum and Kubernetes) comprises hosts 102 and a cluster controller 104. In a cloud computing platform, a cluster of host devices (hosts) that use containers to host applications, such as shown in FIG. 1, is called a "container hosting environment." Hosts 102 create and run containers 106, and connect to each other via a high-speed network (represented by the interconnecting arrows in FIG. 1). As mentioned, in illustrative embodiments, a host 102 creates one or more containers 106 to respectively execute one or more containerized stateful applications (i.e., an application that executes in a container and keeps track of former (previous) container execution states). Cluster controller 104 is responsible for managing container hosts 102. For example, cluster controller 104 monitors container status and launches HA processes, and executes user commands such as commands that cause container migration between hosts and that start backup and recovery operations.

A running (executing) container is launched from its container image. Before a container is launched, the host needs to obtain the corresponding container image from a container registry. In a Docker container implementation, a container image is structured as a chain of layers. Each new modification is represented as a new layer, added on top of its parent (base) layer. Layers can branch, and containers may share their parent layers.

Illustrative embodiments of incremental container state persistency and replication methodologies will now be described.

Figure 2:
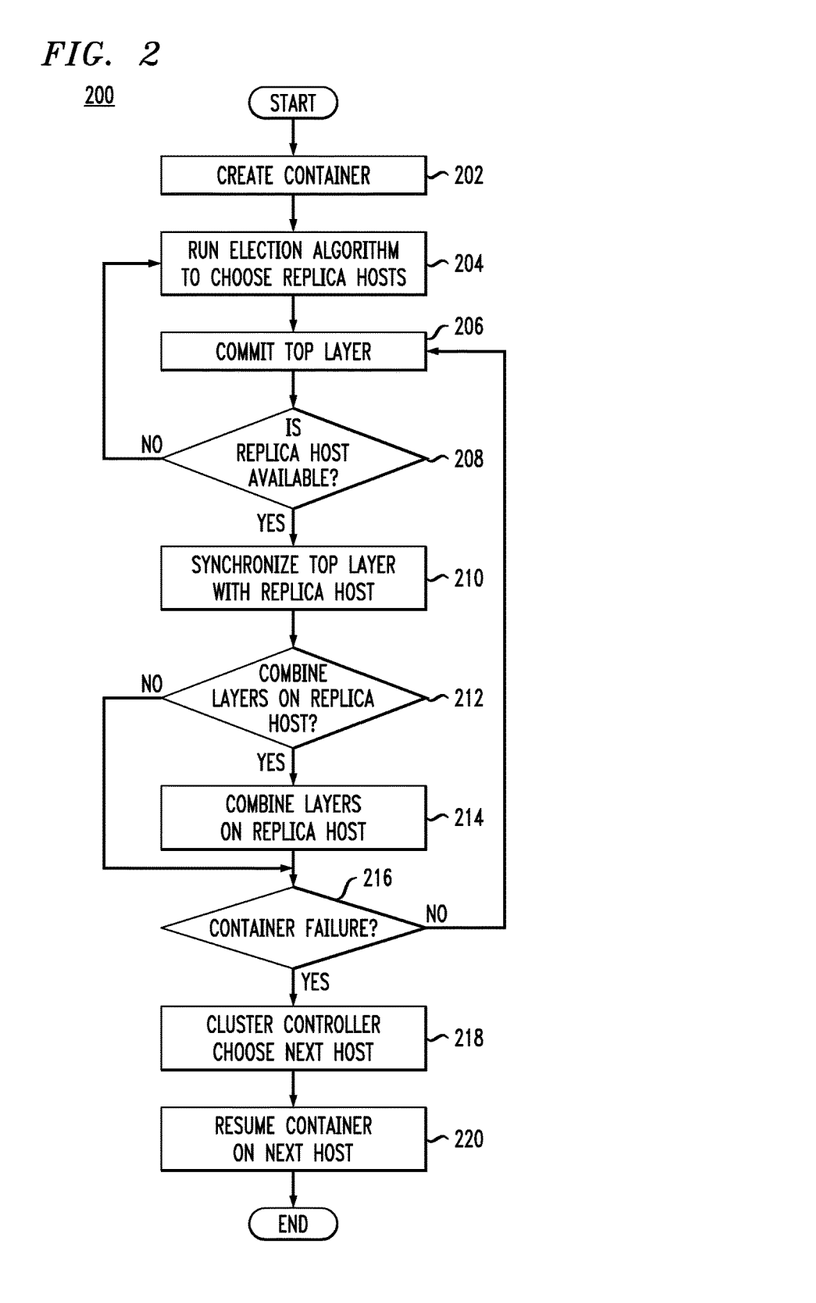
FIG. 2 illustrates a container layer replication methodology, according to an embodiment of the invention.
Figure 3:
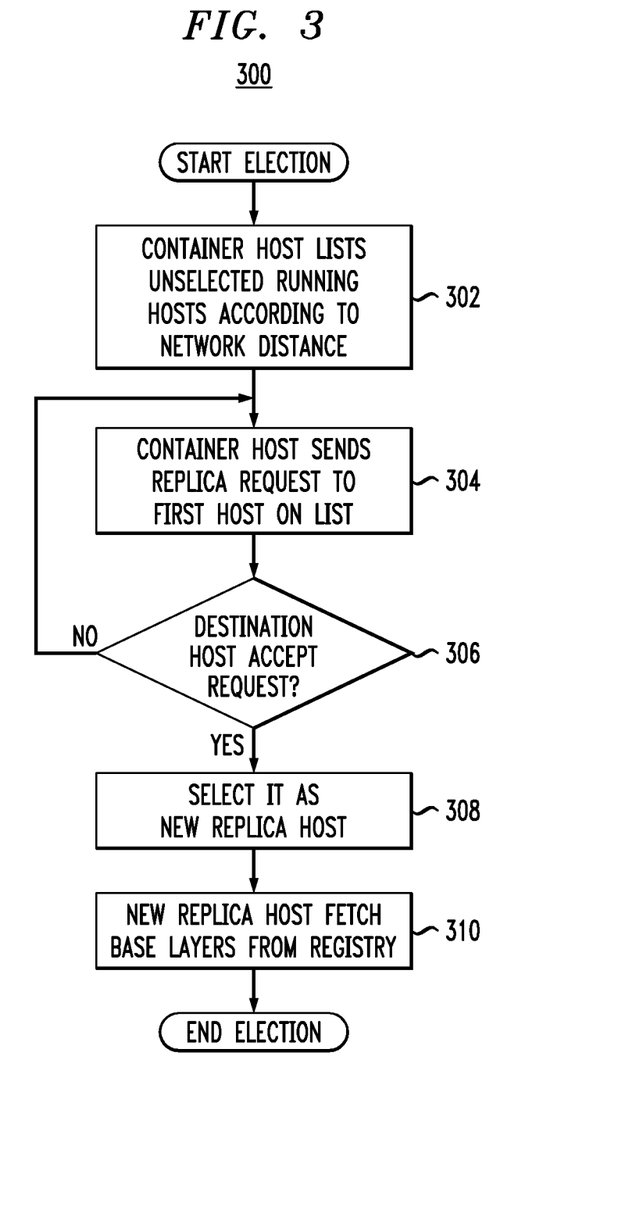
FIG. 3 illustrates a container layer replica host election methodology, according to an embodiment of the invention.

In accordance with illustrative embodiments, after creation of a container 106, a host 102 chooses one or more replica hosts (from among the other hosts 102), commits, and synchronizes layers with the one or more replica hosts regularly. During this process, replica hosts combine layers in accordance with specific conditions, as will be further described herein. When a container fails, the cluster controller 104 chooses the next host (from the one or more replica hosts) to resume the container with state (i.e., "with state" means consistent with the state at which the container was at just prior to failing). FIG. 2 illustrates such a container layer replication methodology 200.

As shown, in step 202, a host creates a container. An election algorithm is executed by the host in step 204 to choose one or more replica hosts. An example of a replica host election algorithm will be described below in the context of FIG. 3. In step 206, the host commits a top layer for the container created in step 202.

Assuming one of the replica hosts is available in step 208 (otherwise the methodology returns to election step 204), the host synchronizes the committed top layer with the replica host in step 210. If multiple layers exist on the replica host (determined by step 212), the layers are combined in step 214.

Assuming the container does not fail (determined in step 216), then the methodology returns to step 206 and commits the top layer to a next available replica host to continue the replication process for each available replica host.

However, if the container fails (in step 216), then the cluster controller chooses the next replica host, in step 218, and instructs the chosen replica host to resume execution of the container in step 220. Note that the resumed container is a replica of the originally created container (from step 202), and advantageously is consistent with the state at which the originally created container failed.

Furthermore, it is to be understood that, upon container creation, assume the system is configured to select n (n>1) replicas for each container. When the new container start-up procedure finishes, the container host tries to find replica hosts. In consideration of the situation that the new container fails while the host is still running, first the container host itself is chosen as a replica. The container host then runs the layer replica election algorithm (to be described in the context of FIG. 3) n−1 times to get other replicas. Finally, the container host sends its replica information to the cluster controller.

As described above, a container host runs an election algorithm to find and establish a connection with a new replica host. First, the container host lists running hosts that have not been selected, then sends a replica request to each host starting from the closest host to the farthest host, according to network distance (i.e., network distance relative to the original container host). Upon receiving a replica request, a destination host checks the following factors:

(1) System load: A host experiencing a heavy system load may have limited resources for a new container, so it is not suitable to act as a replica host. If system load is above a given threshold (i.e., set by the cluster controller), the destination host refuses the request (otherwise it accepts the request).

(2) Replica number: If a host already acts as a replica for several containers, adding it as a new container replica would lead to delay and queuing in the layer synchronization period. For this reason, a replica threshold can be established. Similar to system load, the cluster controller sets the replica threshold.

If both the system load and the replica number are in the acceptable range, the destination host replies with an accept message to the container host and becomes a new replica host. Then, this new replica host begins fetching base layers from a container registry. For instance, for a Docker container, a newly elected replica host downloads corresponding base layers from a Docker Registry. FIG. 3 illustrates such a replica host election methodology 300.

As shown, in step 302, the container host lists unselected running hosts according to network distance. The container host sends a replica request to the first host on the list in step

304. Subject to the factors described above, the destination host can accept the request in step 306; otherwise, it rejects the request and the container host moves to the next host on the list and sends the replica request to that host.

Once a destination host accepts the replica request, it is selected as a new replica host in step 308. Then, as described above, the new replica host fetches one or more base layers from a container registry in step 310.

Figure 4:
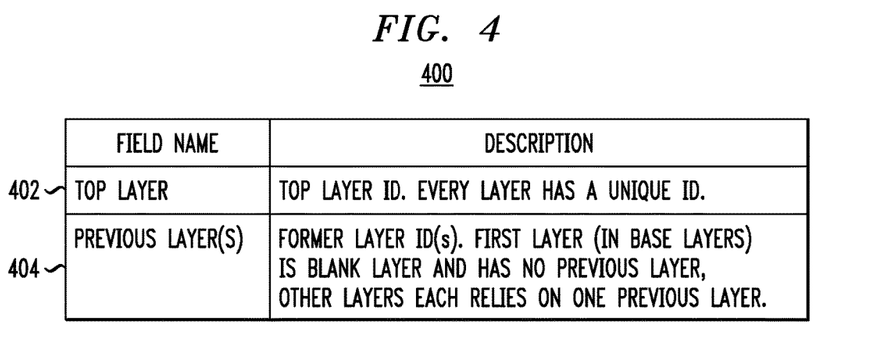
FIG. 4 illustrates dependency information in a container layer file, according to an embodiment of the invention.

A container image is defined by a layer file. The layer file contains container information and layer dependency information. Container information contains the container's main process name and configurations such as, for example, resource limitation, and network port mapping. Layer dependency information contains two fields: top layer and previous layers. FIG. 4 illustrates dependency information 400 in a container layer file. As shown, 402 is an example of top layer descriptive information, and 404 is an example of previous layer descriptive information.

Figure 5:
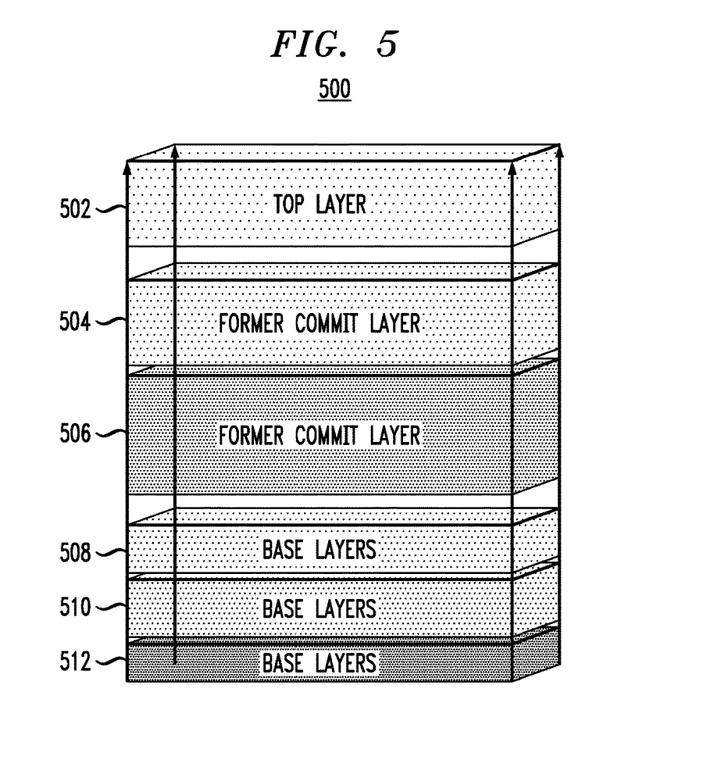
FIG. 5 illustrates a container layer structure, according to an embodiment of the invention.

A commit operation saves the top layer for a container, creating a commit file containing file system modifications since the last commit (i.e., for former (previous) commit operation) or base layers (i.e., for no former commit operation). The host commits a container at regular intervals. This time interval is set at system initialization. After system launch, the cluster controller controls this interval according to network traffic. FIG. 5 illustrates a typical container layer structure 500. As shown, the container layer structure comprises a top layer 502, a first former commit layer 504, a second former commit layer 506, and base layers 508, 510 and 512.

After each commit, the host needs to replicate the top layer to all replica hosts. Since the host itself is a replica host, first it copies the top layer and saves it on disk. As for other replica hosts, the container host synchronizes the top layer with the replica host if available, according to information from the cluster controller. If the replica host is not available, the container host runs the election algorithm (FIG. 3) to get new replica host, register this new host with the cluster controller, and synchronize all layers with the new replica host.

In a container hosting environment according to an illustrative embodiment, a layer combination and consolidation mechanism is provided to compress layers and boost container rebuild speed. Since the union mount mechanism writes all changes on the top layer, if the file does not exist on the top layer, a copy is made on the top layer. The result is that there are two copies of the file: on its original layer and a copy on the top layer. In addition, when deleting a file that is not from the top layer, the file system creates a corresponding "whiteout" file on the top layer instead of simply deleting the file on the original layer. These operations create redundant files between different layers.

In most cases, the latest container state is most important, thus layers are merged to reduce redundancy. A layer manager is provided on the hosts, which merges layers in the following situations:

(1) Low system load: When the system is relatively free, the layer manager launches and starts the layer combination operation to save disk space, reduce redundancy in the container's file system and elevate processing (CPU) utilization.

(2) Number of layers out of range: An overabundance of layers takes up significant disk space. Also, container resumption is costly since the container needs to mount all layers and such mounting is a slow process.

There are two kinds of failovers:

(1) Container failure: In this type of failover, the container's main process fails due to incorrect operation or other factors while the host is available. A container monitor (for instance, the Docker engine) closes the container when the main process exits, but the system can easily rebuild and restart container since we have a layer replica on the same host.

(2) Host failure: The cluster controller handles host failure. Typically, when the cluster controller finds a host failure, it launches HA or backup and recovery processes that rebuild and restart the container on another replica host.

Holding all necessary layers, a replica host can rebuild the container's root file system by performing a union mount on all file system layers, setting the runtime environment from the container information, and redirecting the network connection. Finally, the host runs the main process and resumes container.

After container resumption, the cluster controller changes its record and helps establish connections between the new container host and other replica hosts.

Here we briefly explain how illustrative embodiments of the invention can facilitate containerized stateful application migration, high availability, and backup and recovery.

With respect to migration, depending on the target host, there are two cases in container migration:

(1) The user does not specify the target host, or the target host is one of the replica hosts. Under this circumstance, the cluster controller simply resumes the container on one of the replica hosts.

(2) The target host is not the replica host. According to the network distance to the target host, the cluster controller may copy layers from the nearest replica host or from a group of hosts concurrently.

A container commits and synchronizes regularly with replica hosts. As explained above, when the cluster controller detects a host failure, it selects one of the replica hosts as the next container host. Then, this host runs a failover method and restores the container.

In addition, this process can be extended with checkpoint/restore in user space (CRIU). CRIU can check point the container memory status to persistent storage as a collection of files, and use the files to restore and run the container from the point. By adding CRIU, both disk and memory status of container can be saved, so as to achieve finer-granularity container HA.

The commit operation and layer synchronization can be used to backup containerized applications in a user-appointed time point on the replica hosts. If the layer combination is disabled, users can restore the container from each layer (representing each backup time point) on any replica host.

Figure 6:
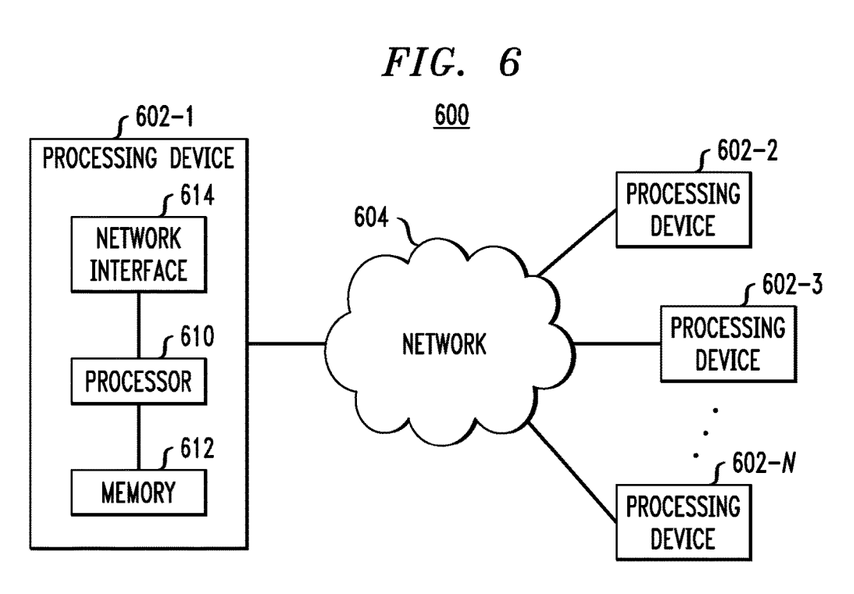
FIG. 6 illustrates a processing platform used to implement a container hosting environment with incremental container state persistency and replication functionalities, according to an embodiment of the invention.

As an example of a processing platform on which a computing environment such as a cloud computing platform with incremental container state persistency and replication functionalities (e.g., FIGS. 1-5) can be implemented is processing platform 600 shown in FIG. 6. It is to be appreciated that processing platform 600 may implement the functionalities described herein. For example, the container hosting environment of FIG. 1, and the methodologies and structures depicted in FIGS. 2-5 can be implemented in processing platform 600.

The processing platform 600 in this embodiment comprises a plurality of processing devices, denoted 602-1, 602-2, 602-3, . . . 602-N, which communicate with one another over a network 604. It is to be appreciated that the methodologies described herein may be executed in one such processing device 602, or executed in a distributed manner across two or more such processing devices 602. It is to be further appreciated that a server, a client device, a computing device or any other processing platform element may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random access memory (RAM), read-only memory (ROM) or other types of memory, in any combination. The one or more software programs when executed by a processing device such as the processing device 602-1 causes the device to perform functions associated with one or more of the components/steps of system/methodologies in FIGS. 1-5. One skilled in the art would be readily able to implement such software given the teachings provided herein. Other examples of processor-readable storage media embodying embodiments of the invention may include, for example, optical or magnetic disks.

Processing device 602-1 also includes network interface circuitry 614, which is used to interface the device with the network 604 and other system components. Such circuitry may comprise conventional transceivers of a type well known in the art.

The other processing devices 602 (602-2, 602-3, . . . 602-N) of the processing platform 600 are assumed to be configured in a manner similar to that shown for computing device 602-1 in the figure.

The processing platform 600 shown in FIG. 6 may comprise additional known components such as batch processing systems, parallel processing systems, physical machines, virtual machines, virtual switches, storage volumes, etc. Again, the particular processing platform shown in this figure is presented by way of example only, and the system shown as 600 in FIG. 6 may include additional or alternative processing platforms, as well as numerous distinct processing platforms in any combination.

Also, numerous other arrangements of servers, clients, computers, storage devices or other components are possible in processing platform 600. Such components can communicate with other elements of the processing platform 600 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    obtaining at least one base layer of a container at a host device of a set of host devices in a container hosting environment, the host device being configured to launch an application program using the container;
    generating, at the host device, a given layer, the given layer being mounted to the obtained at least one base layer as part of the container;
    identifying, at the host device, one or more other host devices of the set of hosting devices as one or more replica host devices;
    performing, at the host device, a commit operation for the given layer of the container; and
    initiating, at the host device, a synchronization operation with each of the one or more replica host devices, the synchronization operation comprising providing the committed given layer of the container to each of the one or more replica host devices, each of the one or more replica host devices forming a replica container based at least in part on the committed given layer, wherein the replica container at each of the one or more replica host devices is state-synchronized with the container such that, responsive to a failure associated with the container at the host device, an execution of the application program is resumable on a given replica host device of the one or more replica host devices based at least in part on the formed replica container of the given replica host device;
    wherein the host devices are implemented via one or more processing devices operatively coupled via a communication network to form the container hosting environment.

2. The method of claim 1, wherein the at least one base layer of the container is a read-only layer and wherein the given layer of the obtained container, prior to the commit operation, is a read-write layer of the obtained container.

3. The method of claim 1, wherein the replica container is formed at each of the one or more replica host devices by merging two or more layers.

4. The method of claim 3, wherein merging two or more layers is based on a criterion selected from a group including a system load criterion and a number of layers criterion.

5. The method of claim 1, wherein the identifying step further comprises the host device creating a list of target host devices from the set of host devices, the list of target host devices comprising host devices that have not yet been selected as replica host devices.

6. The method of claim 5, wherein the list is ordered based on a respective distance within the container hosting environment between each of the target host devices and the host device.

7. The method of claim 5, wherein the identifying step further comprises the host device respectively sending a request to each of the target host devices to be one of the replica host devices.

8. The method of claim 7, wherein the identifying step further comprises the host device receiving an acceptance to be a replica host device from one or more of the target host devices.

9. The method of claim 8, wherein an acceptance by a given target host device of the list of target host devices is based at least in part on a comparison of a system load at the given target host device to a threshold system load for the given target host device.

10. The method of claim 8, wherein an acceptance by a given target host device of the list of target host devices is based at least in part on a comparison of the number of other host devices for which the given target host device already serves as a replica host device to a threshold number of host devices.

11. The method of claim 8, wherein the identifying step further comprises the host device selecting a given target host device of the list of target host devices from which it received an acceptance as a replica host device, and
wherein each target host device selected to be a replica host device fetches one or more base layers of the container from a container registry, the replica container being formed based at least in part on the fetched one or more base layers and the committed given layer.

12. The method of claim 1, wherein the host device serves as one of its own replica host devices.

13. The method of claim 1, wherein the set of host devices is under control of a controller.

14. The method of claim 13, wherein the controller utilizes at least part of the set of replica host devices during a migration process.

15. The method of claim 13, wherein the controller utilizes at least part of the set of replica host devices during a high availability process.

16. The method of claim 13, wherein the controller utilizes at least part of the set of replica host devices during a backup and recovery process.

17. An article of manufacture comprising a processor-readable storage medium having encoded therein executable code of one or more software programs, wherein the one or more software programs when executed by at least one processing device implement the steps of:
obtaining at least one base layer of a container at a host device of a set of host devices in a container hosting environment, the host device being configured to launch an application program using the container;
generating, at the host device, a given layer, the given layer being mounted to the obtained at least one base layer as part of the container;
identifying, at the host device, one or more other host devices of the set of hosting devices as one or more replica host devices;
performing, at the host device, a commit operation for the given layer of the container; and
initiating, at the host device, a synchronization operation with each of the one or more replica host devices, the synchronization operation comprising providing the committed given layer of the container to each of the one or more replica host devices, each of the one or more replica host devices forming a replica container based at least in part on the committed given layer, wherein the replica container at each of the one or more replica host devices is state-synchronized with the container such that, responsive to a failure associated with the container at the host device, an execution of the application program is resumable on a given replica host device of the one or more replica host devices based at least in part on the formed replica container of the given replica host device.

18. The article of manufacture according to claim 17, wherein the identifying step further comprises:
the host device creating a list of target host devices from the set of host devices, the list of target host devices comprising host devices that have not yet been selected as replica host devices;
the host device respectively sending a request to each of the target host devices to be one of the replica host devices;
the host device receiving an acceptance to be a replica host device from one or more of the target host devices; and
the host device selecting a given target host device of the list of target host devices from which it received an acceptance as a replica host device; and
wherein each target host device selected to be a replica host device fetches one or more base layers of the container from a container registry, the replica container being formed based at least in part on the fetched one or more base layers and the committed given layer.

19. An apparatus comprising:
at least one processor operatively coupled to at least one memory forming a host device of a set of host devices in a container hosting environment, the host device being configured to launch an application program using the container, the host device being further configured to:
obtain at least one base layer of a container;
generate a given layer, the given layer being mounted to the obtained at least one base layer as part of the container;
identify one or more other host devices of the set of hosting devices as one or more replica host devices;
perform a commit operation for the given layer of the obtained container; and
initiate a synchronization operation with each of the one or more replica host devices, the synchronization operation comprising providing the committed given layer of the container to each of the one or more replica host devices, each of the one or more replica host devices forming a replica container based at least in part on the committed given layer, wherein the replica container at each of the one or more replica host devices is state-synchronized with the container such that, responsive to a failure associated with the container at the host device, an execution of the application program is resumable on a given replica host device of the one or more replica host devices based at least in part on the formed replica container of the given replica host device.

20. The apparatus according to claim 19, wherein the host device is further configured to:
create a list of target host devices from the set of host devices, the list of target host devices comprising host devices that have not yet been selected as replica host devices;

respectively send a request to each of the target host devices to be one of the replica host devices;

receive an acceptance to be a replica host device from one or more of the target host devices; and select a given target host device of the list of target host devices from which it received an acceptance as a replica host device; and wherein each target host device selected to be a replica host device fetches one or more base layers of the container from a container registry, the replica container being formed based at least in part on the fetched one or more base layers and the committed given layer.

* * * * *

UNITED STATES PATENT AND TRADEMARK OFFICE
CERTIFICATE OF CORRECTION

PATENT NO. : 10,469,574 B1
APPLICATION NO. : 15/134041
DATED : November 5, 2019
INVENTOR(S) : Cang Dai et al.

Page 1 of 1

It is certified that error appears in the above-identified patent and that said Letters Patent is hereby corrected as shown below:

In the Claims

Column 8, Claim 2, Line 55, please delete the term "obtained"

Column 8, Claim 2, Line 56, please delete the term "obtained"

Signed and Sealed this
Eighteenth Day of February, 2020

Andrei Iancu
*Director of the United States Patent and Trademark Office*